United States Patent [19]

Underwood

[11] Patent Number: 4,932,156
[45] Date of Patent: Jun. 12, 1990

[54] METHOD OF CONTROLLING THE COLOR OF MULCH

[75] Inventor: Roger C. Underwood, Ames, Iowa

[73] Assignee: Becker-Underwood, Inc., Ames, Iowa

[21] Appl. No.: 269,269

[22] Filed: Nov. 9, 1988

[51] Int. Cl.$^5$ ............................................. A01G 7/00
[52] U.S. Cl. ........................................................ 47/9
[58] Field of Search ................................. 47/9, 48.5

[56] References Cited

U.S. PATENT DOCUMENTS

| | | | |
|---|---|---|---|
| 1,043,582 | 11/1912 | Faller. | |
| 1,882,377 | 10/1932 | Whittelsey | 47/9 |
| 2,122,895 | 7/1936 | Schuessele | 8/3 |
| 2,623,027 | 6/1949 | Deniston et al. | 260/32.8 |
| 2,772,137 | 11/1956 | Weber | 8/6.5 |
| 2,964,562 | 12/1960 | Landau | 260/578 |
| 3,036,015 | 5/1962 | Woodward | 47/9 |
| 3,685,959 | 8/1972 | Dunn et al. | 21/7 |
| 3,775,147 | 11/1973 | Ferm | 47/9 |
| 4,232,480 | 11/1980 | Videen | 47/9 |
| 4,340,179 | 8/1982 | Knapp | 47/48.5 |
| 4,530,778 | 7/1985 | Nelson | 252/500 |
| 4,716,060 | 12/1987 | Rajadhyaksha et al. | 428/15 |
| 4,788,790 | 12/1988 | Zeager | 47/9 |

*Primary Examiner*—David A. Scherbel
*Assistant Examiner*—Michele A. Van Patten
*Attorney, Agent, or Firm*—Seidel, Gonda, Lavorgna & Monaco

[57] ABSTRACT

A method for controlling the color of mulch for retarding the fading of the color of the mulch and/or restoring the color of mulch that has faded due to prolonged exposure to actinic light and ambient weather conditions by applying a brown color-control solution to the surface of the mulch. The resulting mulch product has a long-lasting fresh, new appearance.

9 Claims, No Drawings

METHOD OF CONTROLLING THE COLOR OF MULCH

FIELD OF THE INVENTION

This invention relates generally to a method for controlling the color of mulch, specifically mulch made from vegetable fiber such as straw, sawdust, and wood chips.

BACKGROUND OF THE INVENTION

Generally mulch is made from various vegetable fibers (e.g., ground waste paper, digested paper pulp, wood chips, wood bark, and sawdust). Mulch materials have long been recognized as effective in providing a protective covering to soil, reducing the evaporation of moisture from the soil, retaining heat in the soil, and retarding the growth of weeds in a landscaped area. However, the primary purpose for using mulch materials is that it provides an aesthetically pleasing decorative covering for a landscaped area. "Landscaped area" hereinafter refers to any area where mulch is placed, e.g. field, lawn.

As a decorative covering, mulches are generally waste by-products of lumber operations (i.e., sawdust, wood chips or bark of cypress, cedar or redwood trees). Such mulches are used in their natural state without the addition of a color coating.

Mulch made from vegetable fibers normally looses its original color in a very short period (approximately four to five weeks, depending on weather conditions) after its initial installation. The loss of color or fading is generally due to the prolonged exposure of mulch to actinic light and varying weather conditions. "Actinic Light" is that radiant light in the spectral region which causes a change in color as a result of oxidation by such irradiation. Keeping the mulch fresh-looking requires frequent re-mulching of the landscaped area several times during the year. This expensive and inefficient process requires the removal of the old mulch from the landscaped area, and the purchase and continuous installation of new mulch. Accordingly, there remains a need for an efficient method of keeping the mulch fresh-looking for a longer period of time and eliminating the necessity of frequent re-mulching.

The present invention meets the need for an efficient method of keeping the mulch fresh-looking for a longer period of time and therefore, virtually eliminates the necessity of frequent re-mulching.

There are a wide variety of dye, paint, stain and pigment compositions which are well known in the art for imparting a brown color. These compositions may be employed in the present invention provided they are non-toxic to vegetation and capable of being sprayed in the form fine droplets. For example, U.S. Pat. No. 2,772,137 discloses a "light mahogany" staining solution that may be used in the present invention. The staining solution comprises: about 1.4% of Brilliant Croceine M, about 0.6% of Resorcin Brown, about 0.3% of Napthol Blue Black, about 14.1% of glycol ethyl ether and about 83.6% of compatible solvent. Further example of colorant compositions well-known in the art that may be incorporated into the present invention is provided by U.S. Pat. No. 1,043,582 which discloses a brown wood coloring composition. The composition comprising of a brown aniline dye dissolved in a hydrocarbon solvent.

U.S. Pat. No. No. 4,716,060 discloses a method for spraying wood furniture and panelling with a colorant composition which resists oxidation and other weathering effects. The colorant combinations of dyes, stains and/or pigments are used in conjunction with 1-dodecanoyl-hexahydroazepines, a preservative compound.

U.S. Pat. No. 3,685,959 discloses the staining or coloring of wood surfaces of furniture or panelling with colored solutions having a tint similar to natural wood colors. The process involves submerging the wood product in a tank of the colorant solution under heat and pressure.

U.S. Pat. No. 2,623,027 discloses a wood stain filler composition for wood surfaces prior to the application of a finishing coat on furniture surfaces. The composition consists of a combination of various dyes and/or pigments mixed with diethylene glycol monoethylether, a binder additive, polyvinyl alcohol and an inert filler.

U.S. Pat. No. 4,530,778 discloses a pre-coating composition for the application to furniture and wood panelling surfaces prior to the application of a finishing coat.

SUMMARY OF THE INVENTION

The invention provides a method for controlling the color of mulch, namely for retarding the fading of the color of mulch and/or restoring the color of mulch that has faded due to prolonged exposure to actinic light and varying weather conditions. The method comprises applying to mulch a brown colorant composition comprising one or more colorants, such as dyes and/or pigments, which resists the action of actinic light and ambient weather conditions, a binding additive, a glycol and water.

It is accordingly an object of the invention to provide a novel method for controlling the color of mulch, namely retarding the fading of mulch and/or restoring the color of faded mulch by applying a dilute solution of the brown color-control composition to the surface of the mulch. The resulting mulch product has an enhanced color. The term "solution" hereinafter refers to a system in which either the brown colorant composition are dissolved in a solvent or very small particles of the brown colorant composition are uniformly dispersed in a liquid.

DETAILED DESCRIPTION OF THE INVENTION

The method of the present invention comprises the application of a color-control composition to a mulch material derived from a vegetable fiber. The combination of various colorants imparts a brownish wood color to the color-control composition.

In the practicing the preferred method of this invention, the colorants are dyes and/or pigments. The dyes and/or pigments may be used in any combination to produce a brown wood color substantially equivalent to the natural colors of mulch made from vegetable fibers, such as the color of conventional cypress, cedar or redwood mulch. The dyes and/or pigments must be non-toxic to vegetation. Some suitable dye combinations include azo dyestuffs, specially that commercially available as "Bismarck Brown R" from the Atlantic Chemical Company, Inc. East Brunswick, New Jersey. Some suitable pigments include Carbon Black or Pigment Black No. 7 produced as "Disperse Black 00-6007"; Pigment Blue No. 15, commercially available as "Fenalan TM Blue FD 3112"; and Pigment Orange No. 5, commercially available as "Luconyl ™ Orange 3052" Each of the above-identified pigments are commercially available from BASF Corp. Chemicals Division, Parsippany, New Jersey. The addition of a basic brown dye in combination with an orange pigment, a blue pigment, and a black pigment produce a realistic orange/brown colorant for use in controlling the color of mulch.

Any suitable binding additive which is non-toxic to vegetation may be employed in the color-control composition, particularly synthetic resins. A preferred synthetic resin is carboxylated acrylate polymer which is commercially available as "Synthemul ™ " from Reichold Chemical, Inc., Dover, Delaware.

Any glycol which is non-toxic to vegetation may be employed in the color-control composition. Such as propylene glycol, dipropylene glycol and ethylene glycol ethers. Ethylene glycol is preferred.

The color-control composition may further optionally include an anti-foaming agent to prevent the formation of foam during the preparation of a dilute solution of the color restorant composition. Such anti-foaming agents which are non-toxic to vegetation include, for example, silicon emulsions, and blends of silica and fatty esters. A preferred anti-foaming agent is commercially known as "Nalco 2151," available from Nalco Chemical Co., Naperville, Illinois.

The practice of the present invention is illustrated by the following non-limiting example.

The brown color-control composition is prepared as follows:

EXAMPLE I
Brown Color-Control Composition

| Ingredients | Percent by Volume | Stock Composition (ml) |
|---|---|---|
| Basic Brown Dye #4 | 13 | 65 |
| Pigment Orange #5 | 31 | 155 |
| Pigment Blue #15 | 2 | 10 |
| Pigment Black #7 | 2 | 10 |
| Carboxylated Acrylate Polymer | 31 | 155 |
| Ethylene Glycol | 2.5 | 12.5 |
| Water | 18 | 90 |
| Anti-Foam | 1.5 | 2.5 |

The brown color-control composition is prepared by combining the ingredients and mixing. After thoroughly mixing the color-control stock composition, a brown color-control solution was prepared by mixing 3 to 4 ounces of the stock composition with 1 gallon of water. The brown color-control solution was transferred to a hand-held sprayer device for applying it to mulch in test landscaped areas. Due to prolonged exposure to actinic light and varying weather conditions, the original color of the mulches in the test landscaped areas had faded to a dull grayish tint. The test landscaped areas (approximately 200 to 400 square feet of mulch material) were covered with various vegetable fiber mulch, such as cedar mulch, cypress mulch, redwood bark, pine cones and composite mixtures of these mulch products.

After an initial spraying of the mulch in the test landscaped areas and allowing 2-5 minutes for the first application to dry, a second application was sprayed on the mulch in a direction perpendicular to that of the first application. The resulting mulch product in each test landscaped area exhibited a vibrant fresh and new appearance equal to that observed for the natural color of conventional cypress, cedar or redwood mulch. The mulch retained the enhanced appearance for several months under outdoor environmental conditions. Hence, the brown color-control solution can be used to restore the color of faded mulch.

The brown color-control solution may also be used to preserve the color of mulch by retarding the fading of the color of the mulch. The term "preserve" refers to maintaining and protecting a long-lasting, vibrant, fresh color imparted to mulch from the application of the brown color-control solution.

I claim:

1. A method for revitalizing the natural color of vegetable fiber mulch, after said mulch has been incorporated as part of a landscape and has faded due to actinic light and ambient weather conditions, said method comprises spraying on said faded mulch a brown color-control composition which resists the action of actinic light and ambient weather conditions, said color-control composition being in a liquid form and simulating the natural brown color of vegetable fiber mulch.

2. A method according to claim 1 wherein said color-control composition is non-toxic to vegetation and comprises:
   (a) at least one colorant;
   (b) a binding additive;
   (c) a glycol; and
   (d) water.

3. A method according to claim 2 wherein said color-control composition comprises, on a volume percentage basis:
   (a) about 48% of said colorant, said colorant comprising, on a volume percentage basis, about 27% of a brown azo dye, about 65% of an orange pigment, about 4% of a blue pigment and about 4% of a black pigment;
   (b) about 31% of said binder additive;
   (c) about 2.5% of said glycol; and
   (d) about 18% of water.

4. A method according to claim 2 wherein said color-control composition further comprises an anti-foaming agent.

5. A method according to claim 2 where the glycol is selected from the group consisting of propylene glycol, dipropylene glycol, an ethylene glycol ether, and ethylene glycol.

6. A method according to claim 5 in which the glycol is ethylene glycol.

7. A method according to claim 1 wherein said binder additive comprises a synthetic resin.

8. A method according to claim 7 wherein said synthetic resin comprises carboxylated acrylate polymer.

9. A brown, vegetable fiber mulch incorporated on a landscape and having a revitalized color obtained by a process comprising spraying a brown color-control composition on said mulch while said mulch was disposed on said landscape, said process being in accordance with claim 1.

* * * * *